(12) United States Patent
Bayus et al.

(10) Patent No.: US 7,870,375 B2
(45) Date of Patent: *Jan. 11, 2011

(54) APPARATUS, SYSTEM, AND METHOD FOR UPDATING A CODE IMAGE FOR A COMMUNICATION ADAPTER

(75) Inventors: Mark Steven Bayus, Tucson, AZ (US); Roger Gregory Hathorn, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 119 days.

This patent is subject to a terminal disclaimer.

(21) Appl. No.: 12/236,349

(22) Filed: Sep. 23, 2008

(65) Prior Publication Data

US 2009/0271598 A1    Oct. 29, 2009

Related U.S. Application Data

(63) Continuation of application No. 10/991,736, filed on Nov. 18, 2004, now Pat. No. 7,454,605.

(51) Int. Cl.
*G06F 9/00* (2006.01)
(52) U.S. Cl. .................. 713/1; 713/2; 713/100
(58) Field of Classification Search .......... 713/1, 713/2, 100
See application file for complete search history.

(56) References Cited

U.S. PATENT DOCUMENTS

| | | | |
|---|---|---|---|
| 6,151,609 A | 11/2000 | Truong | |
| 6,301,661 B1 | 10/2001 | Shambroom | |
| 7,181,512 B1 | 2/2007 | Lesher et al. | |
| 7,454,605 B2 * | 11/2008 | Bayus et al. | 713/1 |
| 2002/0186249 A1 | 12/2002 | Lu et al. | |
| 2003/0131083 A1 | 7/2003 | Inui et al. | |
| 2003/0212788 A1 | 11/2003 | Wilding et al. | |
| 2003/0233361 A1 | 12/2003 | Cady | |
| 2005/0044314 A1 | 2/2005 | Goodman et al. | |
| 2005/0125650 A1 | 6/2005 | Chen et al. | |
| 2006/0161640 A1 | 7/2006 | Terasawa | |
| 2006/0179084 A1 | 8/2006 | Thomas et al. | |
| 2006/0210037 A1 | 9/2006 | Olafsson et al. | |

FOREIGN PATENT DOCUMENTS

| | | | |
|---|---|---|---|
| JP | 2000010911 A | 1/2000 | |
| KR | 1020020030116 A | 4/2002 | |

* cited by examiner

*Primary Examiner*—Chun Cao
(74) *Attorney, Agent, or Firm*—Kunzler Needham Massey & Thorpe

(57) ABSTRACT

An apparatus, system, and method are disclosed for updating a code image for a communication adapter. The apparatus includes a save module, an update module, and a restore module. The save module saves configuration data associated with a connection at a communication adapter. The update module updates a code image on the communication adapter. The restore module restores the configuration data in response to the code image update. Advantageously, the apparatus eliminates the need for conventional host recovery, including relogin and reestablishment of paths and connections, after the code image update.

17 Claims, 9 Drawing Sheets

APPARATUS, SYSTEM, AND METHOD FOR UPDATING A CODE IMAGE FOR A COMMUNICATION ADAPTER

CROSS-REFERENCE TO RELATED APPLICATION

This application is a continuation of U.S. patent application Ser. No. 10/991,736 filed on Nov. 18, 2004, entitled APPARATUS, SYSTEM, AND METHOD FOR ADAPTER CODE IMAGE UPDATE, which is incorporated herein by reference.

BACKGROUND

1. Technological Field

This invention relates to embedded code, such as microcode, and more particularly relates to updating a code image on a communication adapter without a need to perform host recovery.

2. Background Technology

Users continue to require high availability from computer systems and computer subsystems. Web servers, database servers, application servers, and the like are expected to be available around the clock. Maintenance and upgrades to these systems should minimize time the system is offline, if at all.

The computer system or subsystem includes a basic set of instructions for performing operations. This basic set of instructions comprises a fundamental set of computer instructions, similar to an operating system, which define how the computer system or subsystem functions. Generally, this basic set of instructions is referred to as the code image, microcode, embedded code, or the like. The code image typically includes assembly code instructions or raw machine language binary code instructions that are optimized for a particular microprocessor and/or set of hardware.

Typically, a Basic Input Output System (BIOS) program loads the code image into volatile RAM when a computer system is powered on. Alternatively, the code image is stored in non-volatile RAM or other forms of memory. Execution of the instructions in the code image begins once the computer system properly initializes.

Periodically, the code image must be updated to provide improved functionality, resolve programming bugs, and/or support new hardware. It is desirable that an old code image be updated with a new code image with minimal interruption of the computer system concurrently executing the old code image. The code image update should require minimal time, comprise operations of minimal complexity, and provide minimal delay in resuming regular operations once the update completes.

Conventionally, code image updates are performed by a section of the old code image known as the bootstrap code. The bootstrap code is executed in response to an interrupt that signals a code image update operation. The copy operation partially or wholly overwrites the old code image with the new code image. This process is known as a code overlay.

FIG. 1 depicts a conventional code overlay method. The standard technique for performing a conventional code overlay and reinitializing a communication adapter includes taking the communication adapter offline and thereby quiescing the I/O. The communication adapter then turns off light, which is the optical transmission signal used on a fiber optic communication channel. With the communication adapter offline, the new code image is loaded on the communication adapter, replacing the old code image. The code overlay is conventionally performed by a bootstrap code, for instance, stored in the old code or flash image. After loading the new code image, the communication adapter then turns on light.

To reinitialize the communication adapter, the new code image then may initialize any code structures and puts the host bus adapter back online. Unfortunately, the time that the communication adapter is offline during a conventional code overlay is significant enough that I/O requests from a remote host will be rejected. In order to continue with the I/O, the remote host must relogin and establish new paths and connections with the communication adapter.

Another more recent code update method employs a code overlay operation that decreases the amount of time that the communication adapter is offline. In this method, many of the related code overlay operations are performed prior to taking the communication adapter offline. This technology may be referred to herein as "fastload" to distinguish it from other conventional technologies. However, the time required to perform the fastload overlay and to resume light after taking the adapter offline still may necessitate that the host relogin and establish new paths and connections with the communication adapter.

The host in which the host bus adapter is located may retry to send the I/O request during the time that the host bus adapter is offline. If the host is unable to send the I/O during a retry period, the command may timeout for a period, which may vary depending on the specific hardware or application configuration. Upon timing out, the remote host may assume that the communication adapter is not functional, label the port "bad," and remove the path from the path group. The remote host likely has to perform a recovery sequence, as described above, in order to reestablish the path.

As described above, a typical code overlay process requires that the affected hardware device be offline for a relatively substantial amount of time. In the case of a communication adapter, such as a host adapter or host bus adapter, the process may take several minutes to complete, during which time the host may determine that the adapter has failed and switch over to an alternate path. In the case where no alternate path exists, the entire system may be halted during this lengthy process. Whether the system is halted during the timeout and failover period, or whether the system is entirely offline during the code overlay process, disruption of I/O paths and system availability to the user can have costly affects.

From the foregoing discussion, it should be apparent that a need exists for an apparatus, system, and method for updating a code image on a communication adapter without necessitating host relogin and reestablishment of connection paths. Beneficially, such an apparatus, system, and method would overcome the present challenges associated with conventional code overlay technologies.

SUMMARY

The several embodiments of the present invention have been developed in response to the present state of the art, and in particular, in response to the problems and needs in the art that have not yet been fully solved by currently available code image update systems. Accordingly, the present invention has been developed to provide an apparatus, system, and method for updating an adapter code image that overcome many or all of the above-discussed shortcomings in the art.

The apparatus to update a code image is provided with a logic unit containing a plurality of modules configured to functionally execute the necessary operations for a code image update. These modules in the described embodiments include an update module, a save module, a restore module, a fastload module, a login module, and a path module.

In one embodiment, the update module updates a code image on the communication adapter. In a further embodiment, the update module may implement a fastload update to update the code image.

In one embodiment, the save module saves configuration data associated with the connection(s) at the communication adapter. In a further embodiment, the save module may save the configuration data in response to an adapter fastload operation. In one embodiment, the configuration data may include login data and/or path connection data. Alternatively, the configuration data may include other configuration data that describes one or more aspects of the communication channels between a host and a storage system.

In one embodiment, the restore module restores the connection data in response to a code image update. In particular, the restore module may restore login data, path connection data, or other data saved by the save module prior to a code image update. More specifically, the restore module may re-register the hosts with each of the local ports on a communication adapter in substantially the same order as before the code image update. Additionally, the restore module may logically reconnect the hosts with the communication adapter in substantially the same logical paths as before the code image update. In other words, the restore module may restore the communication system to substantially the same configuration after a code image update on a communication adapter as before the code image update.

In one embodiment, the fastload module implements a fastload code update. As described herein, a fastload code update may differ from other conventional code update technologies in that a fastload code update may decrease the amount of time that a communication adapter is offline during a code overlay operation.

In one embodiment, the login module saves the login data in a login data structure prior to a code image update. The login module may save the login data to the electronic memory device of the communication adapter or to another data storage device coupled to the communication adapter.

In one embodiment, the path module saves the path connection data in a path data structure prior to a code image update. The path module may save the path connection data to the electronic memory device of the communication adapter or to another data storage device coupled to the communication adapter.

A system of the present invention is also presented to update a code image. In one embodiment, the system may be embodied in a communication system, including a storage system and one or more hosts coupled to the storage system. The storage system may have a plurality of electronic data storage devices. In one embodiment, a communication adapter may be coupled to the storage system and the adapter may store a code image thereon. The host is configured to send an I/O request to the storage system. Furthermore, an update apparatus may be coupled to the adapter. The update apparatus may save configuration data associated with the communication adapter before the code overlay and restore the configuration data in response to the code overlay.

Another embodiment of the system may include an electronic memory device coupled to a communication adapter. Additionally, the system may include a fastload module and an update module each coupled to the communication adapter. Furthermore, an old code image and a new code image may be stored on the electronic memory device.

A signal bearing medium is also presented to store a program that, when executed, performs one or more operations to update a code image. In one embodiment, the operations include saving configuration data associated with a connection at a communication adapter, updating a code image on the communication adapter, and restoring the configuration data in response to the code image update.

In another embodiment, the operations also may include saving login data in a login data structure prior to the code image update and/or re-registering a plurality of remote ports with a plurality of local ports after the code image update according to the login data in an order substantially similar to an order before the code image update. In another embodiment, the operations also may include saving path connection data in a path data structure prior to the code image update and/or logically reconnecting a plurality of remote ports with a plurality of local ports after the code image update according to the path connection data in a plurality of logical paths substantially similar to a plurality of logical paths before the code image update.

A method is also presented for deploying a computing infrastructure. The computing infrastructure includes computer-readable code integrated into a computing system. In one embodiment, the computer-readable code, in combination with the computing system, is capable of updating a code image. In particular, the method in the disclosed embodiments substantially includes deploying code that enables the operations necessary to carry out the functions presented above with respect to the operation of the described apparatus and system. Furthermore, some or all of the operations of the code may be substantially similar to the operations that are performed when the program on the signal bearing medium is executed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
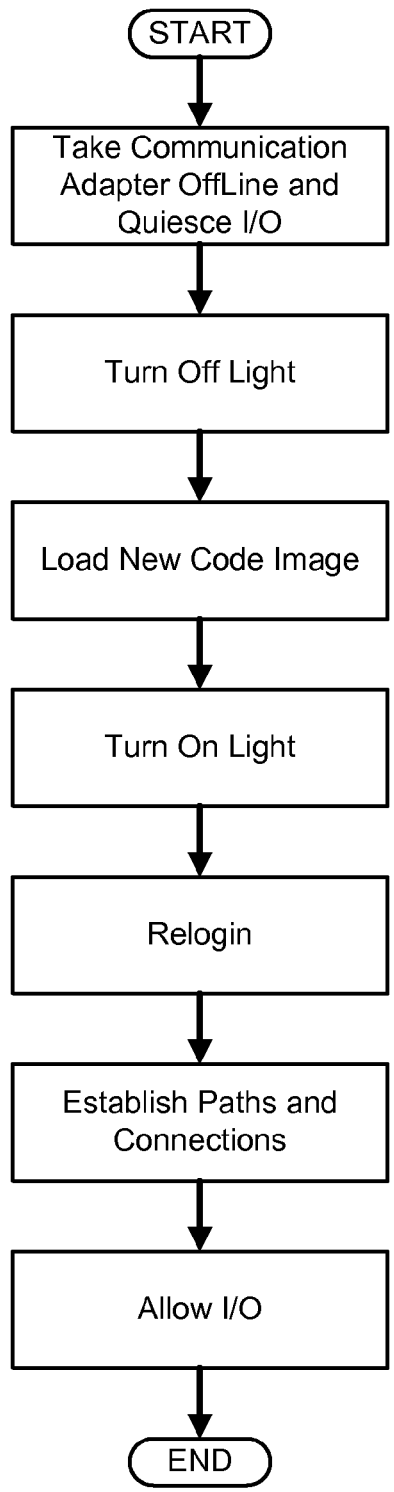
FIG. 1 is a schematic flow chart diagram illustrating a conventional update method.
Figure 2:
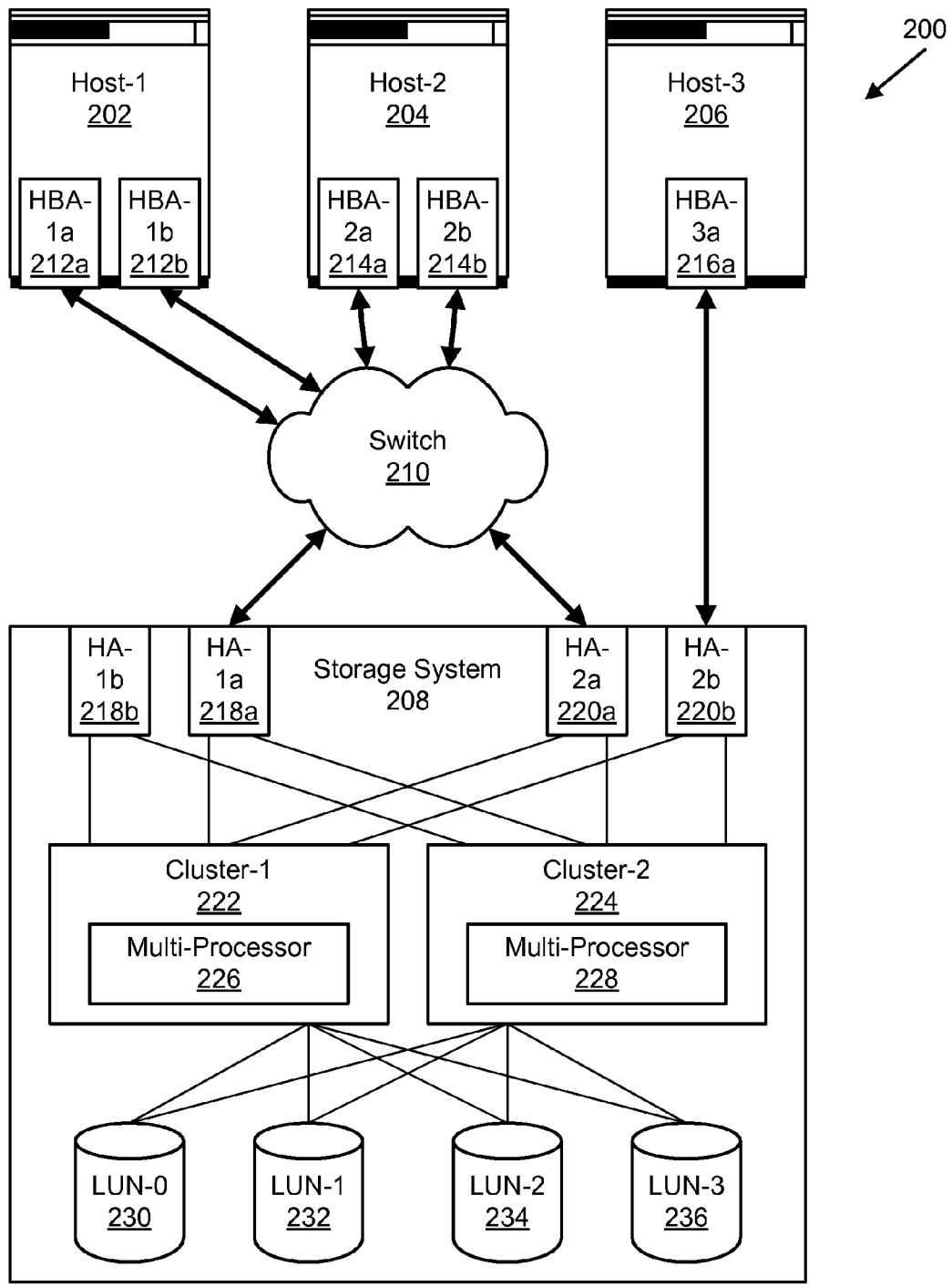
FIG. 2 is a schematic block diagram illustrating one embodiment of a communication system.

FIG. 2 depicts one embodiment of a communication system 200. The illustrated communication system 200 includes three hosts 202, 204, 206 connected to a storage system 208. The storage system 208, in one embodiment, is a storage server configured to store data. The first and second hosts 202, 204 are redundantly connected to the storage system 208 via a switch 210. The third host 206 is directly connected to the storage system 208. Other potential connectivity equipment is omitted for clarity.

Although three hosts 202, 204, 206 are shown in the depicted embodiment, the communication system 200 may operate with fewer or more hosts 202, 204, 206 and storage systems 208. Additionally, the hosts 202, 204, 206 may be connected to the storage system 208 in alternate configurations of varying redundancy and directness. Furthermore, the illustrated cabling connections may comprise Fibre Channel, Enterprise System Connection® (ESCON), Fiber Connection (FICON) channel, Small Computer System Interface (SCSI), and the like. Additionally, the communication system 200 may be configured to support various topologies, including Point-to-Point, Fabric Switched, Fibre Channel Arbitrated Loop (FC-AL), and so forth. Furthermore, the communication system 200 may support various Upper Level Protocols (ULPs), including Fibre Channel Protocol (FCP) and FICON (FC-SB-2).

Each of the depicted hosts 202, 204, 206 includes one or more host bus adapters (HBAs) 212, 214, 216. Each HBA 212, 214, 216 is configured to manage most of the I/O operations required to transfer data between the corresponding host 202, 204, 206 and the storage system 208. In particular, each host bus adapter 212, 214, 216 is optimized to perform many I/O operations very rapidly with little or no involvement by the host 202, 204, 206, minimizing the workload on the host 202, 204, 206. The host bus adapters 212, 214, 216 also may be referred to as communication adapters.

The depicted storage system 208 includes multiple, redundant host adapters 218, 220 and clusters 222, 224. The host adapters 218, 220 are substantially similar to the host bus adapters 212, 214, 216, described above, and also may be referred to as communication adapters. Each cluster 222, 224 may include one or more multi-processors 226, 228 and connections to several logical unit numbers (LUNs) 230, 232, 234, 236. In a particular embodiment, one cluster 222 may primarily access the even LUNs 230, 234, while the other cluster 224 may primarily access the odd LUNs 232, 236. The redundant paths between host adapters 218, 220 and clusters 222, 224 and between multi-processors 226, 228 and LUNs 230, 232, 234, 236 allows for data storage and access in the case of a failure, such as a hardware failure. Additionally, the storage system 208 may employ a redundant array of independent disks (RAID) array, possibly mirroring and striping the stored data, as well as calculating and storing parity data.

Any reference to one of the illustrated hosts 202, 204, 206 is understood to refer to any or all of the hosts 202, 204, 206 unless explicitly noted otherwise. Likewise, any reference to one of the depicted host bus adapters 212, 214, 216 is understood to refer to any one or all of the communication adapters, including the host bus adapters 212, 214, 216 and/or the host adapters 218, 220 unless explicitly noted otherwise. Similarly, reference to one of the redundantly illustrated clusters 222, 224, multi-processors 226, 228, or LUNs 230, 232, 234, 236 is understood to refer to any of the corresponding devices, respectively, unless explicitly stated otherwise.

Throughout this specification, various embodiments will be described in relation to the processor(s) and memory used specifically in the host bus adapters 212, 214, 216 and host adapters 218, 220 for purposes of brevity and clarity in describing the present invention. The embodiments described herein are representative examples and are not intended to limit the scope of the present invention as defined by the claims. One of skill in the art will appreciate that certain embodiments may be implemented in any computer or electrical system that includes a processor such as a microprocessor, Application Specific Integrated Circuit (ASIC), or the like, that executes code images and allows the code images to be updated using a code overlay.

Figure 3:
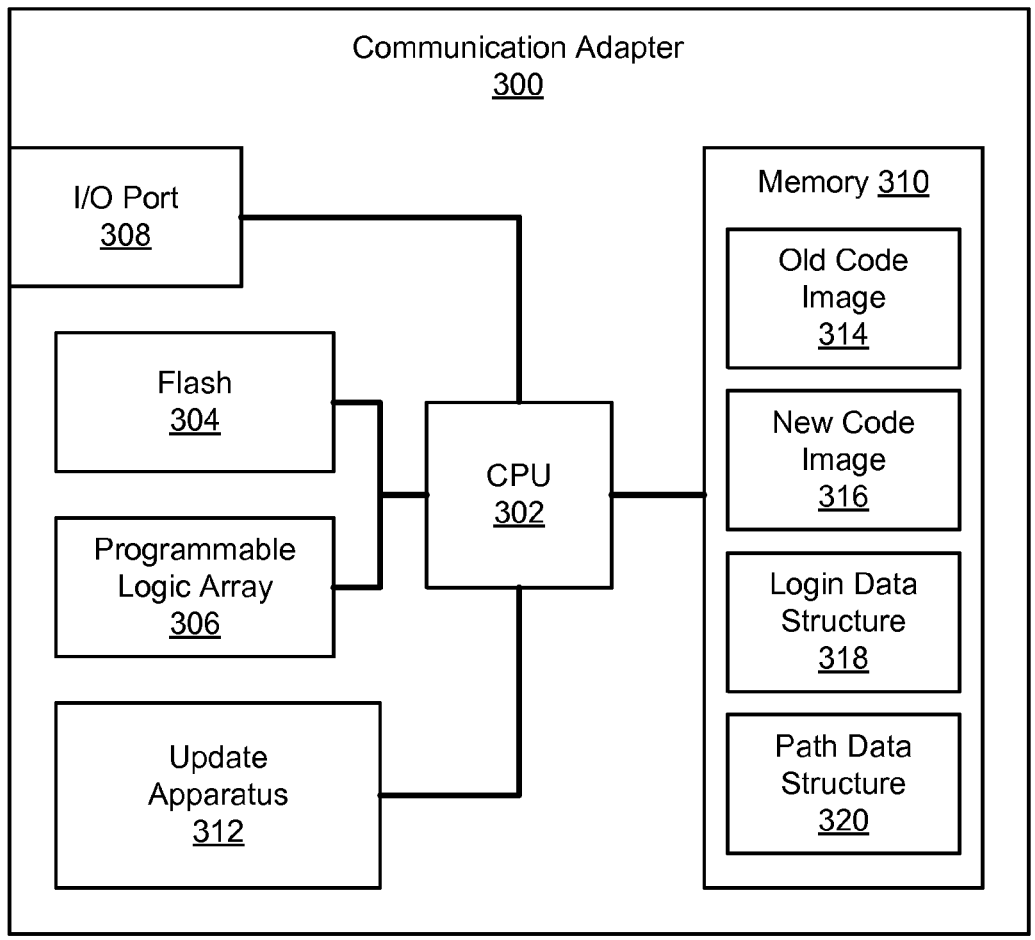
FIG. 3 is a schematic block diagram illustrating one embodiment of a communication adapter.

FIG. 3 depicts one embodiment of a communication adapter 300 that is substantially similar to the host adapters 218, 220 of FIG. 2. The illustrated communication adapter 300 includes a processor (CPU) 302, one or more flash memory devices 304, one or more programmable logic arrays (PLAs) 306, an I/O port 308, a local memory device 310, and an update apparatus 312. In another embodiment, the communication adapter 300 may include multiple I/O ports 308. One example of the update apparatus 312 is described in more detail with reference to FIG. 4.

In one embodiment, an existing code image 314 is stored on the local memory device 310. The existing code image 314 is referred to as an old code image 314 because it may be replaced or otherwise discarded by a new code image 316. The new code image 316 may be loaded to and stored on the local memory device 310, ultimately to overlay the old code image 314.

The CPU 202 is configured to execute operational instructions in the old code image 314. In one embodiment, the old code image 314 is configured to allow the communication adapter 300 to perform high speed I/O operations, such as between a host 202 and the storage system 208. The flash memory devices 304 and PLAs 306 interact with the CPU 302 to properly perform I/O operations. Additionally, the I/O port 308 allows the communication adapter 300 to communicate data and control information with other devices, such as a host 202. Such connections may be via a hub, a switch 210, and/or other connectivity equipment. In one embodiment, the local memory device 310 may be high speed main memory such as Random Access Memory (RAM), Non-Volatile Random Access Memory (NVRAM), or the like.

Figure 4:
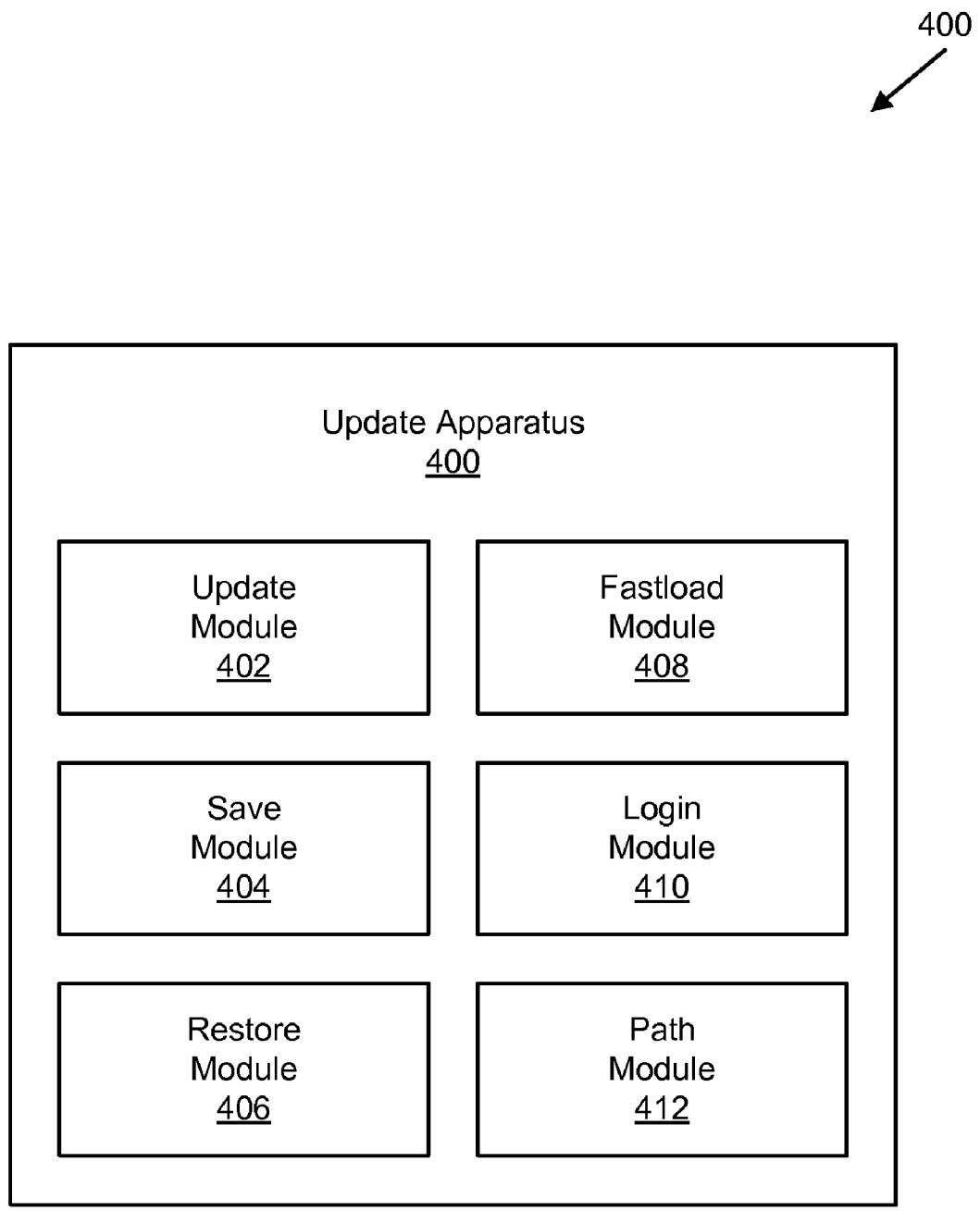
FIG. 4 is a schematic block diagram illustrating one embodiment of an update apparatus.

FIG. 4 depicts one embodiment of an update apparatus 400 that may be substantially similar to the update apparatus 312 of FIG. 3. The illustrated update apparatus 400 includes an update module 402, a save module 404, a restore module 406, a fastload module 408, a login module 410, and a path module 412. Although one embodiment of an update apparatus 312 is depicted within the communication adapter 300, the update apparatus 400 or one or more modules may be coupled to the communication apparatus 300 and stored on a processor 226 or another device within the storage system 208.

In one embodiment, the update module 402 updates a code image on the communication adapter 300. For example, the update module 402 may overlay a new code image 316 over an old code image 314. Alternatively, the update module 402 may update a code image in another manner that may cause the communication adapter 300 to be offline for a period of time.

In one embodiment, the save module 404 saves configuration data associated with the connection(s) at the communication adapter 300. For example, the save module 404 may save the configuration data in response to a code image update request, but prior to execution of the code image overlay. In a further embodiment, the save module 404 may save the configuration data in response to an adapter fastload operation.

The configuration data may include login data and/or path connection data. Alternatively, the configuration data may include other configuration data that describes one or more aspects of the communication channels between a host 202 and the storage system 208. One example of login data is described in more detail with reference to FIG. 5. One example of path connection data is described in more detail with reference to FIG. 6.

In one embodiment, the restore module 406 restores the connection data in response to a code image update. In particular, the restore module 406 may restore login data, path connection data, or other data saved by the save module 404 prior to a code image update. For example, the restore module 406 may re-register the hosts 202, 204, 206 with each of the local ports on a communication adapter 300 in substantially the same order as before the code image update. Additionally, the restore module 406 may logically reconnect the hosts 202, 204, 206 with the communication adapter in substantially the same logical paths as before the code image update. In other words, the restore module 404 may restore the communication system 200 to substantially the same configuration after a code image update on a communication adapter 300 as before the code image update.

In one embodiment, the fastload module 408 implements a fastload code update. As described above, a fastload code update may differ from other conventional code update technologies in that a fastload code update may decrease the amount of time that a communication adapter 300 is offline during a code overlay operation.

Figure 6:
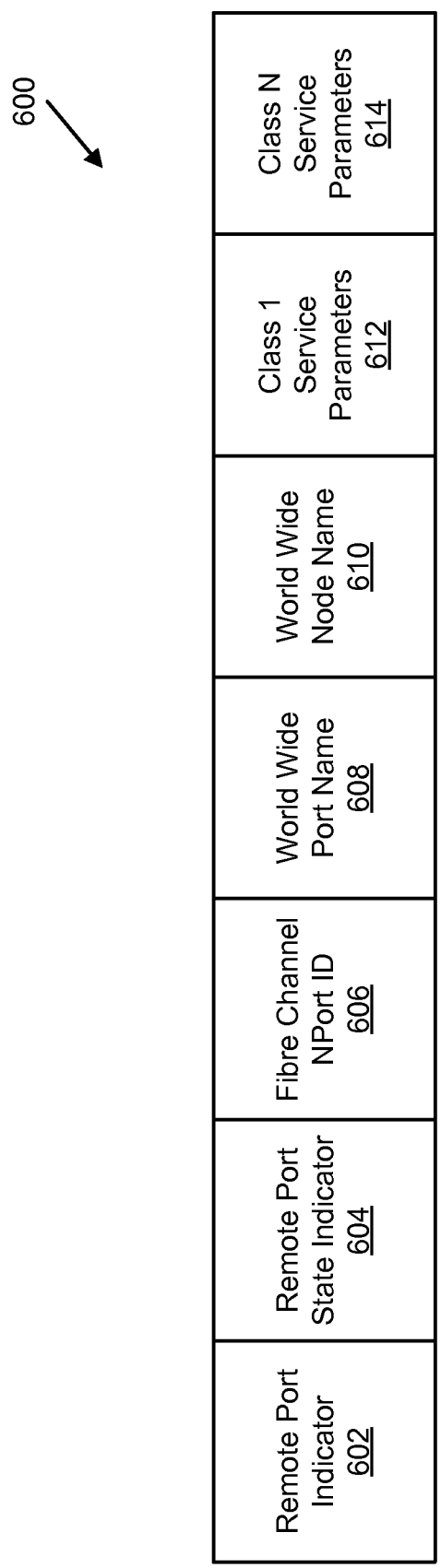
FIG. 6 is a schematic block diagram illustrating one embodiment of a login data structure.

In one embodiment, the login module 410 saves the login data in a login data structure prior to a code image update. The login module 410 may save the login data either in conjunction with the save module 404 or, alternatively, independently of the save module 404. Although an example data structure in which the login data may be saved by the login module 410 is illustrated in FIG. 6, the login module 410 may save the login data in any format or data structure that allows the restore module 406 to later restore the login data, as described above. Furthermore, the login module 410 may save the login data to the electronic memory device 310 of the communication adapter 300 or to another data storage device coupled to the communication adapter 300.

Figure 5:
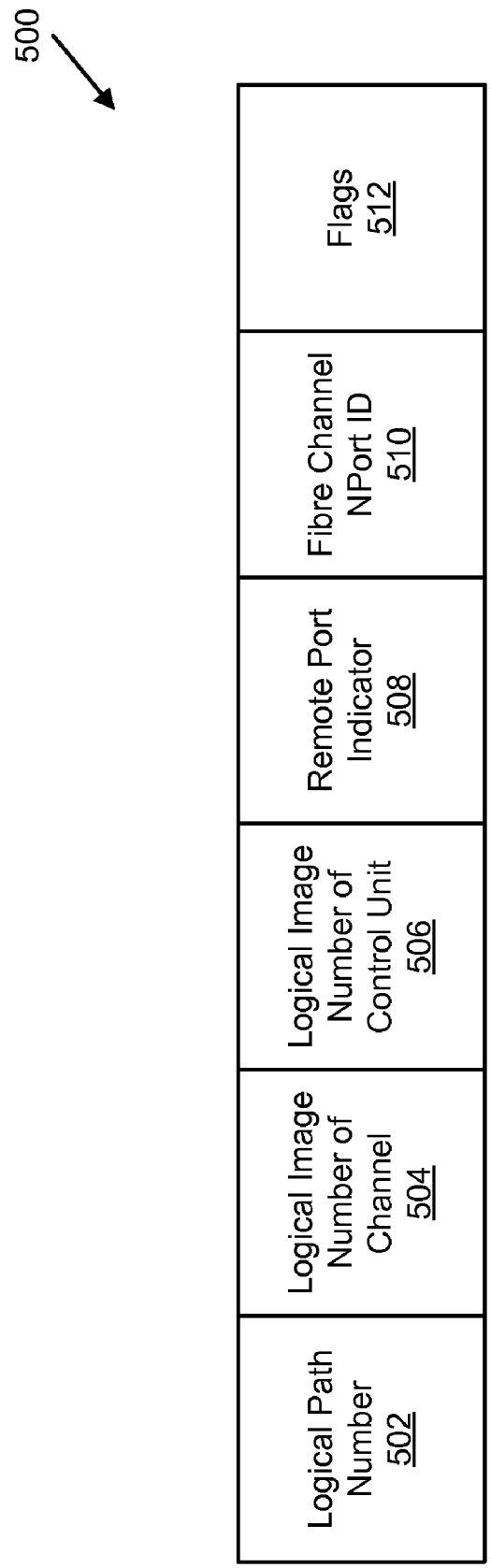
FIG. 5 is a schematic block diagram illustrating one embodiment of a path data structure.

In one embodiment, the path module 412 saves the path connection data in a path data structure prior to a code image update. The path module 412 may save the path connection data either in conjunction with the save module 404 or, alternatively, independently of the save module 404. Although an example data structure in which the path connection data may be saved by the path module 412 is illustrated in FIG. 5, the path module 412 may save the path connection data in any format or data structure that allows the restore module 406 to later restore the path connection data, as described above. Furthermore, the path module 412 may save the path connection data to the electronic memory device 310 of the communication adapter 300 or to another data storage device coupled to the communication adapter 300.

FIG. 5 depicts one embodiment of a path data structure 500 that may be used by the path module 412 to store the path connection data. More specifically, the illustrated path data structure 500 includes a logical path number 502, a logical image number 504 of the Channel (e.g., FICON Host 202), and a logical image number 506 of the control unit (e.g., storage system 208). The illustrated path data structure 500 also includes a remote port indicator (RPI) 508 assigned by the communication adapter 300, a Fibre Channel NPort Identifier 606, and one or more flags 512 to indicate the state of a corresponding logical connection path.

Although the illustrated path data structure 500 includes a number of specific attribute fields, alternative embodiments of the path data structure 500 may include fewer or more attribute fields and may contain more or less data or metadata in each of the attribute fields described herein. Additionally, the format of the depicted path data structure 500 to store the data or metadata is only one exemplary format and, in other embodiments, other formats may be used to store the same or substantially the same information. One particular example of a path data structure 500 is a FICON Logical Path Table containing information about established logical paths.

FIG. 6 depicts one embodiment of a login data structure 600 that may be used by the login module 412 to store the login data. More specifically, the illustrated login data structure 600 includes a remote port indicator (RPI) 602 assigned by the communication adapter 300, a remote port state indicator 604 to indicate the state of the remote port, and a Fibre Channel NPort Identifier 606. The illustrated login data structure 600 also includes a world wide port name (WWPN) 608 to identify the I/O port 308, a world wide node name (WWNN) 610 to identify the communication adapter 300, Class 1 service parameters 612, and additional class service parameters 614 (e.g., Class 2, Class 3, etc.).

Although the illustrated login data structure 600 includes a number of specific attribute fields, alternative embodiments of the login data structure 600 may include fewer or more attribute fields and may contain more or less data or metadata in each of the attribute fields described herein. Additionally, the format of the depicted login data structure 600 to store the data or metadata is only one exemplary format and, in other embodiments, other formats may be used to store the same or substantially the same information. One particular example of a login data structure 600 is a Remote Port Table containing Fibre Channel Login information.

Figure 7:
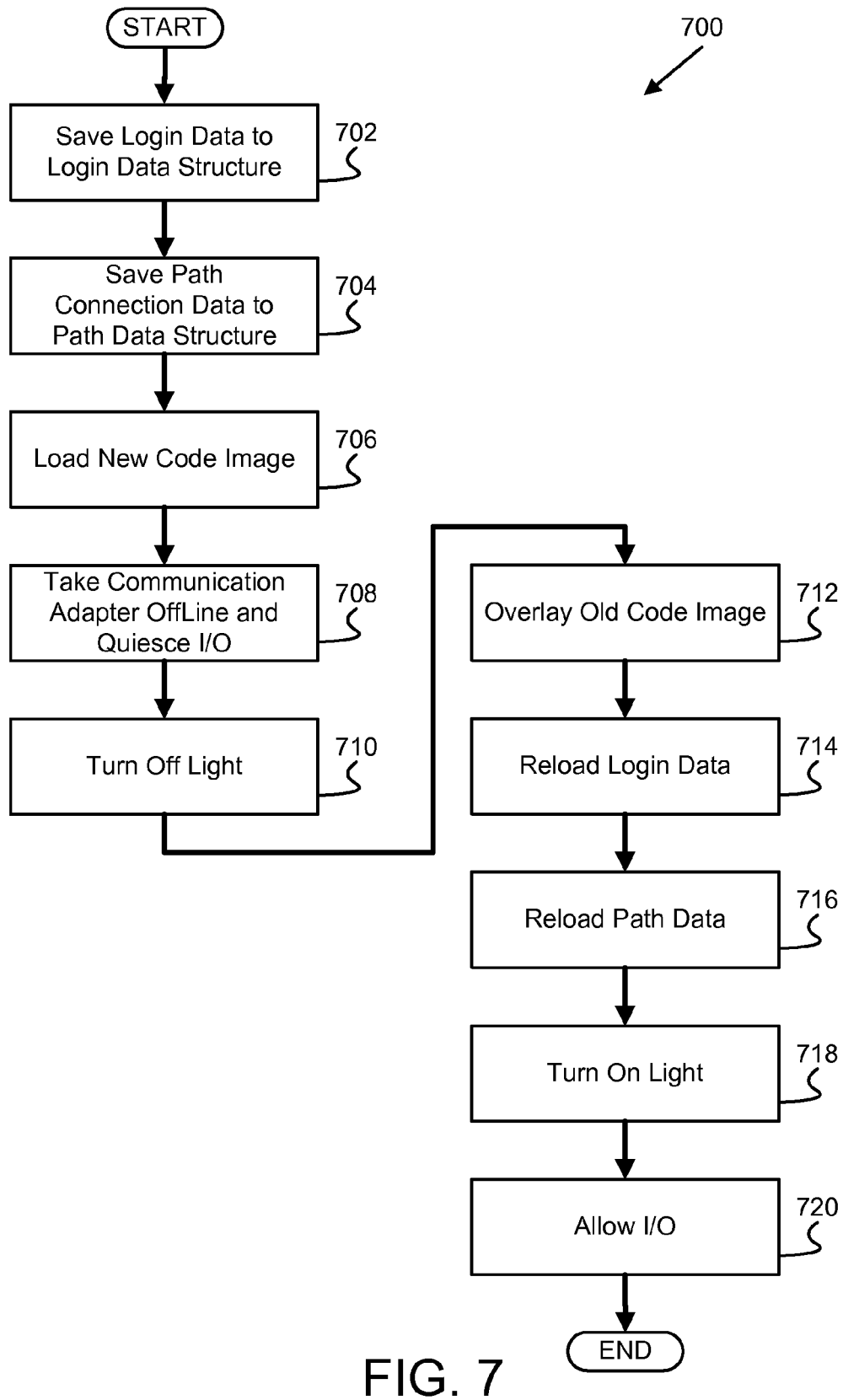
FIG. 7 is a schematic flow chart diagram illustrating one embodiment of an update method.

FIG. 7 depicts one embodiment of an update method 700 that may be employed on the communication system 200 to update a code image on a communication adapter 300. The illustrated update method 700 may begin in response to a code image update request or, alternatively, a related operation, such as loading a new code image 316 into the memory 310.

The save module 402 then saves 702 the login data to the login data structure 600. In one embodiment, the save module 402 may invoke the login module 410 to create the login data structure 600 and/or save the login data in the login data structure 600. Similarly, the save module 402 saves 704 the path connection data to the path data structure 500. In one embodiment, the save module 402 may invoke the login module 410 to create the path data structure 500 and/or save the path connection data in the path data structure 500.

The update module 402 then loads 706 the new code image 316 into the memory 310, if it has not already been loaded. The update module 402 subsequently takes 708 the communication adapter 300 offline and quiesces I/O on the communication adapter 300. Once the communication adapter 300 is offline and the light is turned off 710, the update module 402 may overlay 712 the old code image 314 with the new code image 316.

After updating 712 the code image, but before attempting to resume communications via the communication adapter 300, the restore module 408 reloads 714 the login data from the login data structure 600. Similarly, the restore module 408 reloads 716 the path connection data from the path data structure 500. By reloading 714, 716 the login data and the path connection data, the remote host 202 is not necessarily required to relogin or reestablish connection paths with the updated communication adapter 300.

After reloading 714, 716 the login and path connection data, the update module 402 then turns on light at the communication adapter 300, which subsequently allows 720 I/O again from the host 202. In one embodiment, this update method 700, unlike many conventional code image update technologies, can be performed by the update apparatus 400 within a small window of time that is insufficient to require that a remote host 202 relogin or reestablish connection paths with the updated communication adapter 300.

Figure 8:
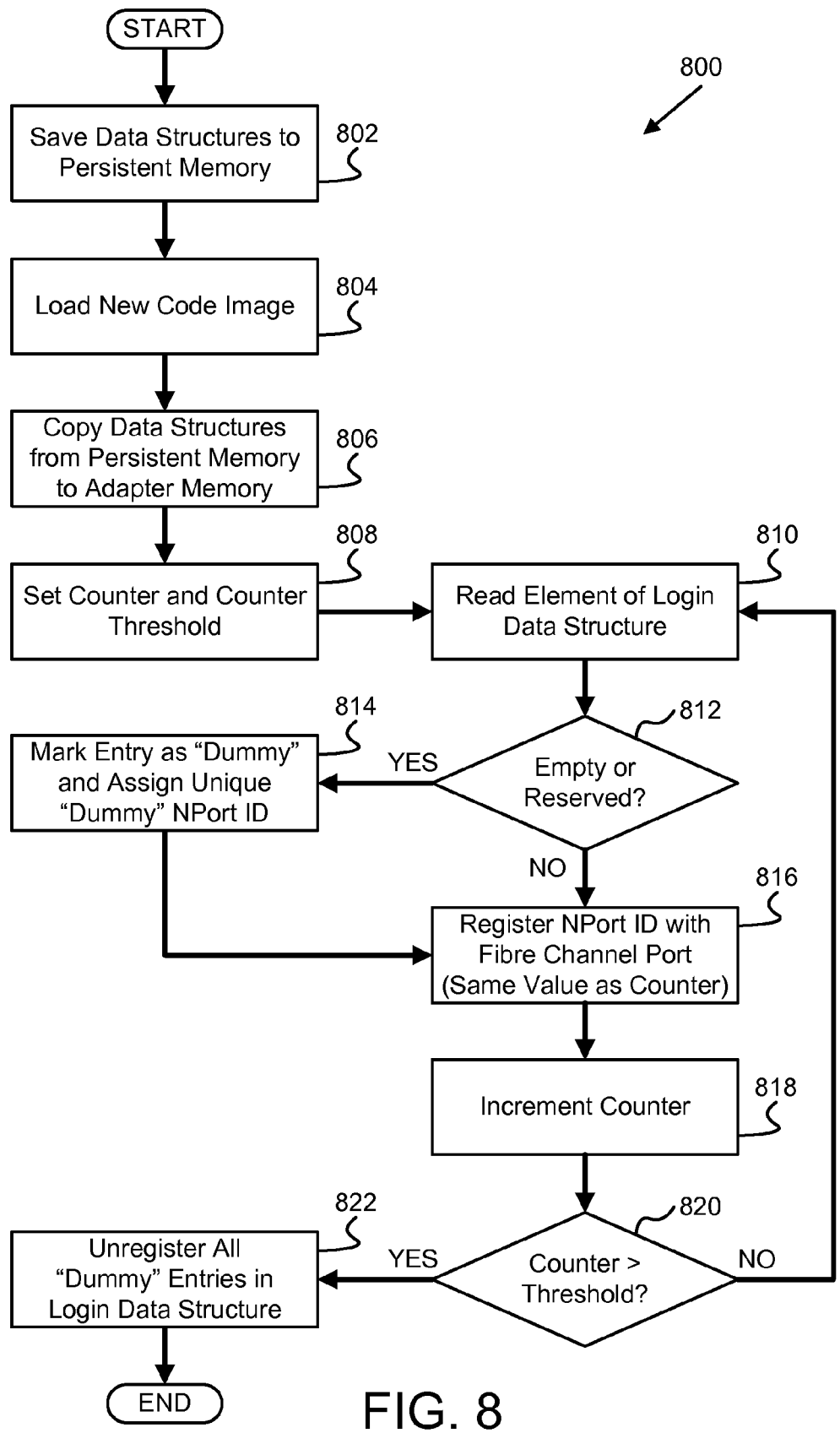
FIG. 8 is a schematic flow chart diagram illustrating another embodiment of an update method.

FIG. 8 depicts another embodiment of an update method 800 that may be employed on the communication system 200 to update a code image on a communication adapter 300. The illustrated update method 800 begins by saving 802 the path data structure 600 and the login data structure 500 to persistent memory. In one embodiment, the save module 404 saves the data structures 500, 600 to persistent memory within the storage system 208.

Subsequently, the update module 402 loads 804 the new code image 316 into the memory 310 on the communication adapter 300 and updates the code image. The restore module 406 then may copy 806 the path data structure 600 and the login data structure 500 from the persistent memory location to the electronic memory device 310 on the communication adapter 300. In one embodiment the path data structure 600 and the login data structure 500 are individually copied to the adapter memory 310.

The restore module 406 then sets 808 a counter (e.g., n=1) and a counter threshold (e.g., MAX_RPI=highest non-zero remote port indicator (RPI) in the login data structure 600) in preparation for restoring the pre-update adapter configuration. The restore module 406 then reads 810 the element from the login data structure 500 that corresponds to the counter (e.g., first element for n=1, second element for n=2, etc.). The restore module 406 then determines 812 if the selected element is an empty entry or a reserved fabric NPort identifier and, if so, marks 814 the element as a "dummy" entry. The restore module 406 also assigns 814 a "unique" dummy NPort identifier to the selected element. Otherwise, or after marking 814 the selected element as a "dummy" element, the restore module 406 registers 816, for example, the NPort identifier with the Fibre Channel port. In one embodiment, the remote port index (RPI) for the selected element is the same value as the counter.

The restore module 406 then increments 818 the counter and, if the counter is less than 820 the threshold, returns to read the next element in the login data structure 500. The update method 800 continues as described above until all of the elements from the login data structure 500 have been read and the counter increments 818 beyond the threshold. The restore module 406 then unregisters 822 all of the "dummy" elements in the login data structure 500 and the depicted update method 800 ends.

Figure 9:
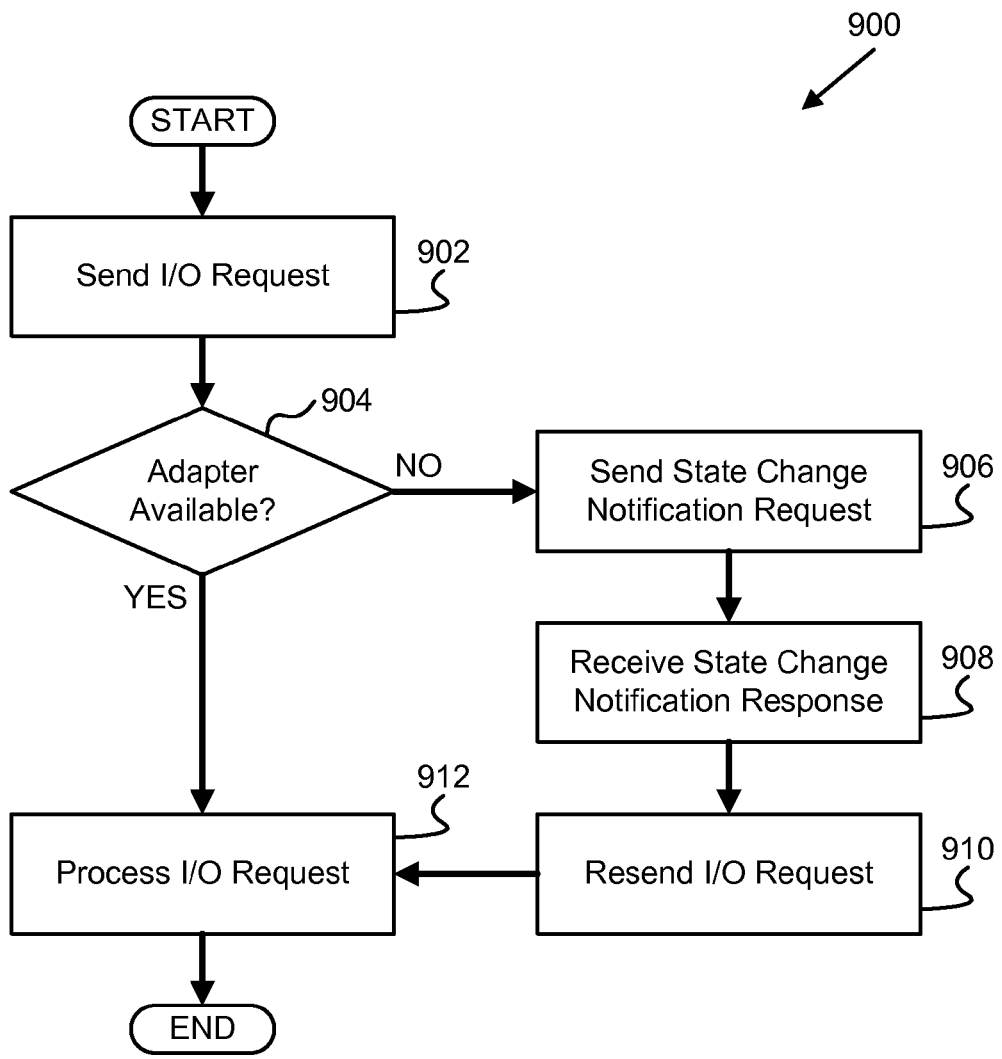
FIG. 9 is a schematic flow chart diagram illustrating one embodiment of a host communication method.

FIG. 9 depicts one embodiment of a host communication method 900 that may be employed on a host 202 during a code image update on a corresponding communication adapter 300. The illustrated update method 900 begins by the host 202 sending 902 an I/O request to the storage system 208 via a communication adapter 300. If the communication adapter 300 is available 904, then the I/O request is processed 906 according to normal operations of the storage system 208.

However, if the communication adapter 300 is unavailable 904 (i.e., offline due to a code image update by the update apparatus 400), then the I/O request will not be processed. Rather, the host 202 may send 908 a state change notification request to determine if the communication adapter 300 is still available or if a new connection needs to be established, such as through a redundant connection path. For example, in the case of FCP communications, the host 202 may send 908 a port discovery (PDISC) request. Alternatively, in the case of FICON communications, the host 202 may send 908 a test initialization (TIN) request.

Because the length of time that the corresponding communication adapter 300 is offline is minimal, and because the login data structure 600 and the path data structure 500 are as they were before the update, the host 202 subsequently receives 910 a state change notification response that indicates that the communication adapter 300 is still available. In other words, the host 202 is not required to relogin or reestablish paths and connections because the communication adapter 300 is reconfigured after the code image update in substantially the same manner as it was configured prior to the code image update. Therefore, the host 202 may resend 912 the I/O request to be processed 906 by the storage system 208 as if the communication adapter 300 were never taken offline. The depicted host communication method 900 then ends.

Hence, it may be advantageous to provide a communication adapter 300 having an update apparatus 400 that minimizes the time that the communication adapter 300 is offline for a code image update. As described above, such an update apparatus 400 facilitates communications between the host 202 and the storage system 208 without the need for the host 202 to relogin or reestablish connections with the storage system 208, despite the code image update.

The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to update a code image, the apparatus comprising:
   a save module configured to save configuration data associated with a connection at a communication adapter;
   an update module configured to update a code image on the communication adapter; and
   a restore module configured to restore the configuration data in response to the code image update, wherein communication is reconnected using the restored configuration data, wherein the configuration data comprises login data corresponding to a host coupled to the communication adapter, wherein the login data comprises an order in which a plurality of remote hosts are registered with a corresponding plurality of local ports at the adapter prior to the code image update.

2. The apparatus of claim 1, further comprising a login module configured to save the login data in a login data structure prior to the code image update.

3. The apparatus of claim 2, wherein the restore module is further configured to re-register the plurality of remote ports with the plurality of local ports after the code image update in substantially the same order as before the code image update.

4. The apparatus of claim 1, wherein the configuration data comprises path connection data corresponding to a plurality of hosts coupled to the communication adapter.

5. The apparatus of claim 4, wherein the path connection data comprises a logical connection path between a plurality of remote ports and a corresponding plurality of local ports at the adapter prior to the code image update.

6. The apparatus of claim 4, further comprising a path module configured to save the path connection data in a path data structure prior to the code image update.

7. The apparatus of claim 6, wherein the restore module is further configured to logically reconnect the plurality of remote ports with the plurality of local ports after the code image update in substantially the same logical paths as before the code image update.

8. The apparatus of claim 4, wherein the save module is further configured to save the configuration data in response to an adapter fastload operation.

9. A system to update a code image, the system comprising:
   a storage system having a plurality of electronic data storage devices;
   a communication adapter coupled to the storage system, the adapter having an code image thereon;
   a host coupled to the communication adapter, the host configured to send an I/O request to the storage system; and
   an update apparatus coupled to the communication adapter, the update apparatus configured to update the code image on the communication adapter, to save configuration data associated with the communication adapter before the code image update, and to restore the configuration data in response to the code image update, wherein communication is reconnected using the restored configuration data, wherein the configuration data comprises login data corresponding to a host coupled to the communication adapter, wherein the login data comprises an order in which a plurality of remote hosts are registered with a corresponding plurality of local ports at the adapter prior to the code image update.

10. The system of claim 9, further comprising a switch, the host coupled to the communication adapter via the switch.

11. The system of claim 9, further comprising an electronic memory device coupled to the communication adapter, the electronic memory device configured to store the configuration data during the code image update.

12. The system of claim 9, wherein the configuration data includes path connection data corresponding to a plurality of hosts coupled to the communication adapter.

13. A system to update a code image, the system comprising:
   an electronic memory device within a communication adapter;
   an old code image stored on the electronic memory device;
   a new code image stored on the electronic memory device;
   a fastload module configured to overlay the old code image with the new code image; and
   an update apparatus to save configuration data associated with the communication adapter before the code overlay and to restore the configuration data in response to the code overlay, wherein communication is reconnected using the restored configuration data, wherein the configuration data comprises login data corresponding to a host coupled to the communication adapter, the login data comprising an order in which a plurality of remote hosts are registered with a corresponding plurality of local ports at the communication adapter prior to the code overlay.

14. The system of claim 13, wherein the configuration data comprises path connection data corresponding to a plurality of hosts coupled to the communication adapter, the path connection data comprising a logical connection path between a plurality of remote ports and a corresponding plurality of local ports at the adapter prior to the code image update.

15. An apparatus to update a code image, the apparatus comprising:
   means for saving configuration data associated with a connection at a communication adapter;
   means for updating a code image on the communication adapter;
   means for restoring the configuration data in response to the code image update; and
   means for re-registering a plurality of remote ports with a plurality of local ports after the code image update in an order substantially similar to an order before the code image update.

16. The apparatus of claim 15, further comprising means for updating the code image on the communication adapter without necessitating a login by a host computer coupled to the communication adapter.

17. The apparatus of claim 15, further comprising means for updating the code image on the communication adapter without necessitating a reestablishment of a logical connection path by a host computer coupled to the communication adapter.

\* \* \* \* \*